Nov. 28, 1933.    R. STRESAU    1,936,693
WELDROD FOR ARC WELDING
Filed Jan. 21, 1930

INVENTOR.
Richard Stresau
BY
ATTORNEY.

Patented Nov. 28, 1933

1,936,693

UNITED STATES PATENT OFFICE 1,936,693

WELDROD FOR ARC WELDING

Richard Stresau, Wauwatosa, Wis., assignor to A. O. Smith Corporation, Milwaukee, Wis., a corporation of New York Application January 21, 1930. Serial No. 422,420

21 Claims. (Cl. 219—8)

This invention relates to a weldrod for arc welding and cutting and to a method of manufacturing the same, the present application being a continuation in part of my co-pending application, Serial No. 14,939, filed March 12, 1925 which issued April 8, 1930, as Patent No. 1,754,063.

The invention particularly relates to a weldrod having a covering principally containing finely divided cellulose material such as wood flour and a binder such as sodium silicate and to the application of such a covering to the rod.

The object of the invention is to provide a covered metallic weldrod having more uniform welding characteristics and which may be more readily and economically manufactured.

Another object is to provide an improved method of manufacturing a covered weldrod whereby a weldrod having more uniform and desirable properties is produced.

The invention resides in mixing a lubricant material such as kaolin or silica sand with the other ingredients of the covering whereby the application of the covering to the rod is greatly facilitated and a weldrod having improved welding characteristics is produced.

The accompanying drawing illustrates an embodiment of the invention and apparatus for manufacturing the same, the views of the drawing being as follows.

In the manufacture of weldrods having coverings of substantial thickness as distinguished from dipped coatings it has been found preferable to employ an extrusion process of applying the covering to the rod in order to obtain a uniform and reliable product for commercial use.

Figure 1:
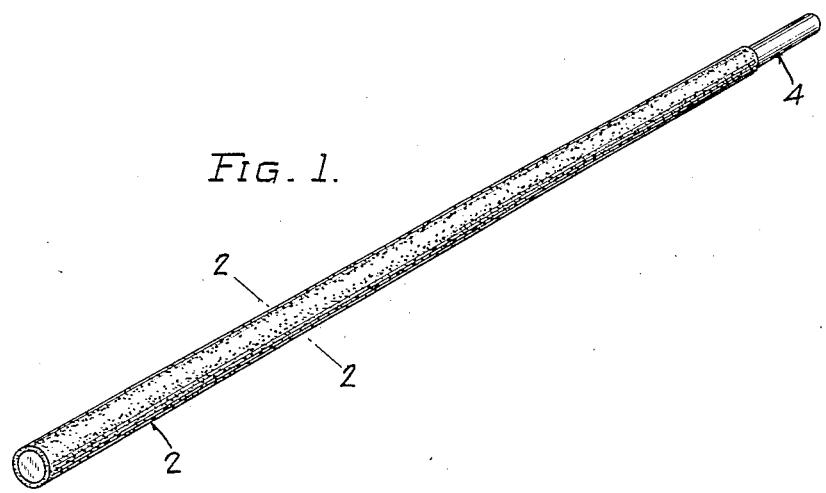
Figure 1 is a perspective view of a weldrod.
Figure 2:
Fig. 2 is a section on line 2—2 of Figure 1.
Figure 3:
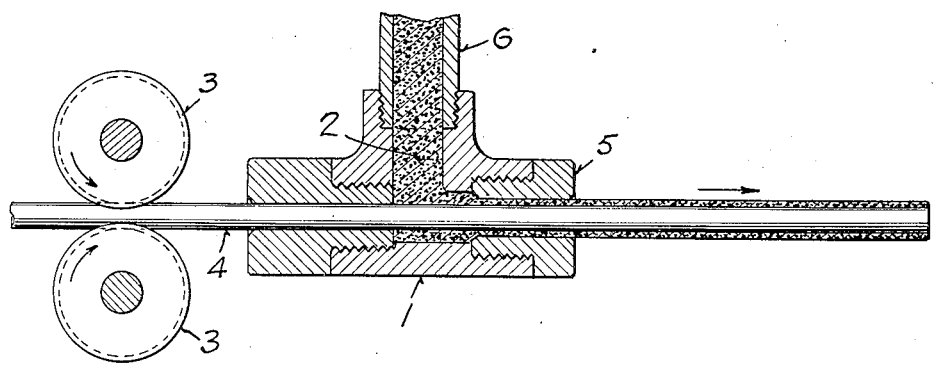
Fig. 3 is a sectional view diagrammatically showing an extrusion apparatus for applying the covering to the rod.

This process is clearly illustrated in Fig. 3 which shows an extrusion chamber 1 in which the covering material 2 is maintained under pressure, a pair of rollers 3 for feeding the metal rod 4 through said chamber, and a nozzle 5 through which the rod and covering material thereon are discharged.

The covering material 2 is fed under pressure to the chamber 1 through a supply pipe 6 leading from any suitable source of supply to maintain the required material and pressure in the chamber 1, the material having been mixed thoroughly in the required proportions prior to its introduction into the chamber 1.

The process may be and preferably is continuous, so that the rods 4, which are ordinarily of definite lengths, are covered successively and immediately following each other. After the rods are covered they are preferably baked or suitably dried to harden the covering thereon.

Prior to the present invention it was found that, where the covering material consisted of wood flour or other cellulose flour and sodium silicate, the wood flour sometimes became compressed into a mass in the chamber 1 while the sodium silicate filtered through the mass and passed out with the rod 4 through the nozzle. This difficulty resulted in weldrods having non-uniform qualities and often there was a deficient amount of wood flour therein. Furthermore, the chamber 1 often became clogged and had to be cleaned of the mass, thereby requiring frequent interruptions in production of the weldrods.

The present invention overcomes these and other difficulties by providing a lubricant in the covering material which prevents the formation or collection of the cellulose mass in chamber 1 and which causes a more uniform flow of materials through the extrusion nozzle 5.

Kaolin is the preferred lubricant to be employed although other materials such as non-fibrous carbohydrate flours, silica sand, sodium carbonate, bauxite and graphite have been found to be suitable.

Sometimes kaolin produces an excess slag which may be undesirable in which case, silica flour may be employed with the kaolin.

A suitable covering mixture is as follows:

|  | Per cent |
|---|---|
| Wood flour (by weight) | 15.3 |
| Sodium silicate of 42 Beaumé | 70.6 |
| Kaolin (by weight) | 9.4 |
| Silica flour (by weight) | 4.7 | it being understood that other proportions of the materials may be employed and that additional ingredients such as ferro manganese or alloying material may be used within the scope of this invention.

The kaolin or lubricant not only facilitates the manufacture of the weldrod, but it also modifies the characteristics of the covering in a manner contributing to stabilize the arc and to produce more uniform welding conditions. The kaolin contributes to the bulk and thickness of the covering and aids in preventing excessive concentration of the volatile sawdust in the covering.

The invention is applicable not only in extrusion processes, but in any process wherein the covering material is caused to flow by pressure in applying it to the weldrod.

I claim:

1. A weldrod comprising a metal rod having an extruded covering thereon containing finely divided cellulose material, sodium silicate and a material effecting a more uniform distribution of the cellulosic material and sodium silicate during the extrusion of the same upon the rod.

2. A weldrod comprising a metal rod having an extruded covering thereon containing as its principal constituents wood flour, sodium silicate and kaolin.

3. A weldrod comprising a metal rod having a compressed covering thereon containing as its principal constituents cellulose flour, sodium silicate, kaolin and silica flour.

4. The method of manufacturing a weldrod which comprises mixing covering material containing finely divided cellulose material, sodium silicate and a material facilitating uniform flow of the cullulose and sodium silicate, extruding said mixture upon a metal rod to form a covered weldrod, and thereafter drying said covering.

5. The method of manufacturing a weldrod which comprises mixing covering material containing wood flour, sodium silicate, and kaolin in predetermined proportion, extruding said mixture upon a metal rod to form a covered weldrod, and thereafter drying said covering as by baking.

6. The method of manufacturing a covered metallic arc welding electrode having finely divided cellulosic material and sodium silicate in its covering, comprising the steps of mixing finely divided cellulosic material and a material facilitating its flow with sodium silicate to produce a plastic mass, extruding the mass under pressure upon a metallic electrode core, and drying the covering to remove excess moisture therefrom and harden the same.

7. The method of manufacturing a covered metallic arc welding electrode having wood flour and sodium silicate in its covering, comprising the steps of mixing wood flour and dry finely divided material facilitating its flow under pressure with sodium silicate to produce a plastic mass, extruding the mass under pressure upon a metallic electrode core, and drying the covering to remove excess moisture therefrom and harden the same.

8. The method of manufacturing a covered metallic arc welding electrode having finely divided cellulosic material and sodium silicate in its covering, comprising the steps of mixing finely divided cellulosic material and a material which facilitates the uniform extrusion of the mixture with sodium silicate to produce a plastic mass, extruding the mass under pressure upon a metallic electrode core, and drying the covering to remove excess moisture therefrom and harden the same.

9. The method of manufacturing weldrods which comprises mixing finely divided cellulose with sodium silicate into a mass capable of hardening to form a gas retaining covering for a welding rod, adding kaolin to the mass to enable it to be uniformly extruded, extruding the mass upon a metallic rod and drying the mass to harden it upon the rod.

10. The method of manufacturing a weldrod, which comprises mixing finely divided cellulose, sodium silicate and silica flour to constitute a plastic homogeneous mass, extruding said mass upon a metal rod, and drying the extruded mass to form a gas retaining covering on the rod.

11. The method of manufacturing a weldrod, which comprises mixing finely divided cellulose with sodium silicate to form a mass capable of hardening, adding kaolin and silica flour to the mass to form an extrudable material, extruding the material upon a metal rod, and drying the material to harden it into a gas retaining covering for the rod.

12. The method of manufacturing a weldrod which comprises mixing finely divided cellulose with sodium silicate in the proportions by weight of substantially 15.3 parts of cellulose to 70.6 parts of sodium silicate to constitute a mass capable of hardening to form a gas retaining covering on a welding rod, adding substantially 9.4 parts of kaolin and 4.7 parts of silica flour to the mass for lubricating the mass to enable it to be uniformly extruded, extruding the mass upon a metal rod, and drying the mass to harden it.

13. A composition of matter for coating a metallic arc weldrod that comprises a cellulosic flour, sodium silicate mixed with the flour to act as a binder, and a material maintaining a uniform distribution between the cellulosic flour and sodium silicate mixed therewith to constitute a plastic mass which may be continuously and uniformly extruded upon the surface of a metal rod.

14. A covering material for arc welding rods comprising finely powdered cellulose flour, silicate of soda mixed with the cellulose flour to constitute a binder, and kaolin mixed with the cellulose flour and the binder to lubricate the mixture, whereby it may be extruded upon the surface of a metal rod without separation of the binder from the cellulose.

15. A covering material for arc welding rods comprising finely powdered cellulose flour, silicate of soda mixed with the cellulose flour to constitute a binder, and silica flour mixed with the cellulose flour and the binder to lubricate the mixture, whereby it may be extruded upon the surface of a metal rod without separation of the binder from the cellulose.

16. A covering material for metallic arc weldrods, comprising finely divided cellulose mixed with a sodium silicate binder and containing kaolin and silica flour for lubricating the mixture to enable it to be extruded continuously and uniformly upon the surface of a metal rod without separation of the binder from the cellulose during the extruding process.

17. A covering material for arc welding rods, comprising a hardening material suitable for being applied by extrusion, containing substantially 15.3 parts of finely divided cellulose, 70.6 parts of sodium silicate, 9.4 parts of kaolin, and 4.7 parts of silica flour by weight.

18. A weldrod comprising a metal rod having an extruded covering thereon containing as its principal constituents cellulose flour, sodium silicate, kaolin and silica flour in substantially the proportions by weight of 15.3 parts of cellulose flour, 70.6 parts of sodium silicate, 9.4 parts of kaolin, and 4.7 parts of silica flour.

19. An arc welding electrode having a covering thereon of a uniform mixture of substantially equal parts by weight of finely divided cellulosic material and finely divided slag forming material, and a binder therefor.

20. A metallic arc welding electrode having a covering thereon of a uniform mixture of substantially equal parts by weight of finely divided cellulosic material and finely divided silicic material, and a binder comprising a silicate.

21. A metallic arc welding electrode having a covering thereon of finely divided cellulosic material, a substantial amount of slag forming material, and sodium silicate as a binder, all of said ingredients being substantially uniformly distributed throughout the covering.

RICHARD STRESAU.